(12) United States Patent
Shaw et al.

(10) Patent No.: US 11,283,784 B2
(45) Date of Patent: Mar. 22, 2022

(54) PEER TO PEER COMMUNICATION IN AD-HOC AND CLOAKED NETWORKS

(71) Applicant: COLORTOKENS, INC., Santa Clara, CA (US)

(72) Inventors: Abhisek Kumar Shaw, Bengaluru (IN); Mallesh Kanderayanahalli Marthandappa, Bengaluru (IN); Vinay Gudur, Bengaluru (IN)

(73) Assignee: COLORTOKENS, INC., Santa Clara, CA (US)

( * ) Notice: Subject to any disclaimer, the term of this patent is extended or adjusted under 35 U.S.C. 154(b) by 184 days.

(21) Appl. No.: 16/140,665

(22) Filed: Sep. 25, 2018

(65) Prior Publication Data

US 2020/0099671 A1 Mar. 26, 2020

(51) Int. Cl.
*G06F 21/00* (2013.01)
*H04L 29/06* (2006.01)
*H04L 67/104* (2022.01)
*H04L 69/22* (2022.01)

(52) U.S. Cl.
CPC .......... *H04L 63/061* (2013.01); *H04L 63/029* (2013.01); *H04L 63/0428* (2013.01); *H04L 67/104* (2013.01); *H04L 69/22* (2013.01)

(58) Field of Classification Search
CPC .............. H04L 63/164; H04L 63/0272; H04L 63/0428; H04L 63/061; H04L 63/08; H04L 63/20; H04L 63/029; H04L 67/104; H04L 69/22

See application file for complete search history.

(56) References Cited

U.S. PATENT DOCUMENTS

| | | | |
|---|---|---|---|
| 2002/0046348 A1* | 4/2002 | Brustoloni | H04L 29/12537 726/6 |
| 2009/0175194 A1* | 7/2009 | Akhter | H04L 45/02 370/254 |
| 2016/0345179 A1* | 11/2016 | Chen | H04L 43/106 |
| 2017/0149743 A1* | 5/2017 | Fukuda | H04L 63/0428 |
| 2018/0183584 A1* | 6/2018 | Sun | H04L 9/0841 |

* cited by examiner

*Primary Examiner* — Ghazal B Shehni
(74) *Attorney, Agent, or Firm* — Barry Choobin; Patent 360LLC

(57) ABSTRACT

A method and system for peer-to-peer communication across network is described. At an internet key exchange (IKE) daemon, an IKE packet including an application data packet and an IKE header is received. The received IKE packet is de-multiplexed to identify a data destination that receives the application data packet, the data destination identified based on a data destination identifier included in the IKE header. Finally, the application data packet is forwarded to a receiving peer when the data destination is the receiving peer.

11 Claims, 5 Drawing Sheets

PEER TO PEER COMMUNICATION IN AD-HOC AND CLOAKED NETWORKS

BACKGROUND

Data Security is important during communication over the Internet. Security protocol suites, for example, Internet Protocol security (IPsec) authenticate and encrypt packets of data sent over internet protocol (IP) networks. IPsec secures applications at the IP layer. The IPsec protocol suite includes an Internet Key Exchange (IKE) protocol that is used to set up a security association (SA) between communicating peers.

While IKE ensures data security during communication over the Internet, it is not well suited as a security protocol when building peer to peer network in Ad-hoc and cloaked networks due to the several reasons, specifically when the peers have to communicate across Network Address Translator (NAT) and/or Firewalls. For these cases, IKE does not provide a solution to resolve address, User Datagram Protocol (UDP) hole punching, etc., that are required to establish communication in NAT-ed and/or firewalled Ad-hoc and/or cloaked network.

Currently IKE extension is being used to partly solve this problem. However, this requires a change in the protocol stack of IKE/IPsec for any new deployment and/or challenges. Therefore, a solution is required that allows peer to peer communication in NAT-ed and/or firewalled ad-hoc and cloaked network that requires future deployments and challenges with no changes in protocol stack of IKE/IPsec.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

DETAILED DESCRIPTION

Embodiments of techniques for peer to peer communication in ad-hoc and cloaked network are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
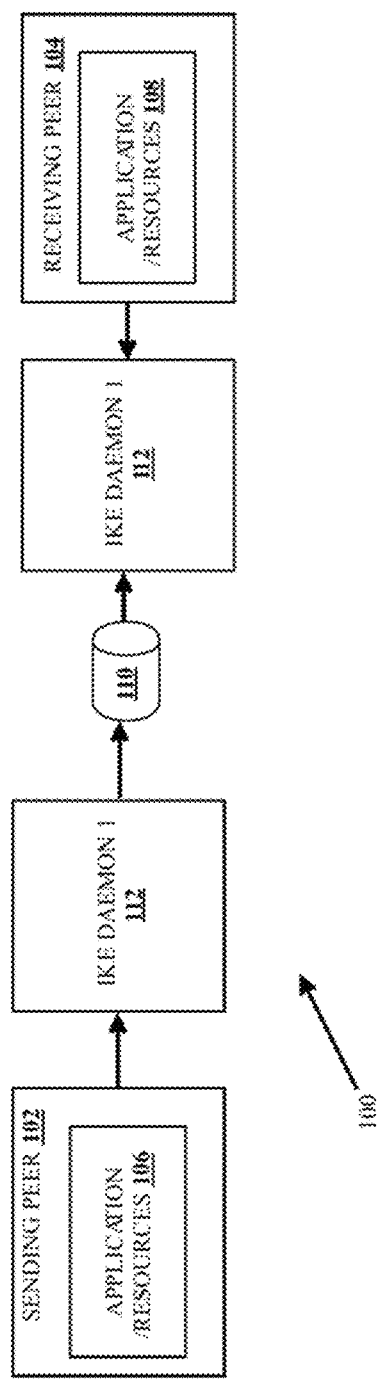
FIG. 1 is a block diagram illustrating high level architecture of a system for peer-to-peer communication across network, according to one embodiment.

FIG. 1 is a block diagram illustrating high level architecture of a system 100 for peer-to-peer communication across network, according to one embodiment. A peer to peer (P2P) network includes peers, which may be computer systems, that are connected to each other via the internet. In one embodiment, a P2P communication is to be established between one peer, for example sending peer 102, and another peer, for example receiving peer 104. In FIG. 1, two peers have been shown for sake of simplicity. However, a P2P network may include any number of peers and the proposed peer-to-peer network communication works for any such network. In one embodiment, the P2P communication is established between an application (or resource) 106 executing at one of the peers, for example sending peer 102, and an application (or resource) 108 executing at another peer, for example receiving peer 104.

The IKE protocol establishes a secure tunnel 110 between the peers, for example, between a sending peer 102 and a receiving peer 104. IKE is a protocol that is used to set up a security association (SA) in the IPsec protocol suite. SA is the establishment of shared security attributes between two peers to support secure communication. SA may include attributes such as: cryptographic algorithm and mode; traffic encryption key; and parameters for the network data to be passed over the connection. In one embodiment, the application (or resource) 106 at the sending peer 102 sends an application specific session negotiation packet to establish the IKE secure tunnel 110 for P2P communication between the sending peer 102 and the receiving peer 104. After the IKE secure tunnel 110 is established, IPsec protects the data sent between the peers, for example sending peer 102 and receiving peer 104, by applying the security parameters defined by the SAs during tunnel setup. In one embodiment, IKE daemons, for example IKE daemon 1 110 and IKE daemon 2 112, establish the secure IKE tunnel 110 between the peers, i.e., the sending peer 102 and the receiving peer 104. An IKE daemon is a software program that runs in User space and is responsible for handling IKE Protocol. In one embodiment, IKE daemon, for example IKE daemon 1 112 and IKE daemon 2 114, runs on User Datagram Protocol (UDP) Port 500/4500 of the peer, for example sending peer 102 and receiving peer 104, respectively. IKE daemons, for example IKE daemon 1 112 and IKE daemon 2 114, may also execute at a gateway between sending peer 102 and the receiving peer 104.

The application (or resource) 106 at the sending peer 102 may send an application specific session negotiation packet to the IKE daemon 1 for establishing the secure tunnel 110. The application (or resource) 106 at the sending peer 102 also sends an application data packet to the IKE daemon 1 112. The IKE daemon 1 112 includes an IKE multiplexer/demultiplexer (mux/dmux) 116. The mux in the IKE mux/dmux 116 generates an IKE packet including the received application specific session negotiation packet or the application data packet. An IKE packet includes an IKE header and an application data payload. The IKE header includes different parameters to establish a secure connection and handle IKE based communication between the two peers, sending peer 102 and receiving peer 104.

In one embodiment, the IKE version used for establishing the communication is IKE version 2 (IKE v2). IKEv2 has a header format that defines the different data payloads to be included in the IKE header. IKE allows extending the header to include other payloads in the IKEv2 header. In one embodiment, the IKE extension header is extended to include a data destination payload that receives the application data. The data destination may be a peer, for example receiving peer that receives the application data, or an IKE daemon. The mux/demux generates the IKE packet by encapsulating the application data payload with the data destination identification information. In one embodiment, the application data payload is encrypted and then the application data payload is encapsulated with the data destination identification information to obtain the IKE package.

The IKE daemon, for example IKE daemon 1 112, then forwards the IKE package to another IKE daemon, for example IKE daemon 2 114. The IKE daemon 2 114 also includes a mux/demux 118 that de-multiplexes the received IKE packet to obtain the application data payload and identify a data destination for the received application data payload. The data destination may be determined based on the data destination in the data destination payload included in the IKE packet. As discussed above, the data destination may be a peer, for example, the receiving peer 104 or the IKE daemon, for example the IKE daemon 2 114. In case the data destination is the receiving peer 104 then the application data payload is finally send to the peer, for example destination peer 104.

In case, the data destination is the IKE daemon, for example IKE daemon 2 114 then the application data payload is send to an IKE state machine 120 in the IKE daemon, for example the IKE daemon 2 114. IKE is a stateful protocol, i.e., each message of an outgoing IKE is tied to a previously received message. For example, to establish a secure IKE tunnel, an application specific session negotiation packet including a sending peer IP address and a negotiation request may be received. The IKE state machine then waits for receiving another application specific session negotiation packet before initiating the negotiation process to establish the secure IKE tunnel.

In one embodiment, after the secure tunnel 110 has been established then a peer to peer communication can be established between the peers, for example sending peer 102 and receiving peer 104, using the IKE extension header. The established secure IKE tunnel allows communication across any tunnel or firewall between the sending peer 102 and the receiving peer 104. In one embodiment, the proposed mechanism of establishing a IKE secure tunnel and using an IKE extension header can be used for establishing other type of communication, for example, communication across ad-hoc and cloaked network.

Figure 2:
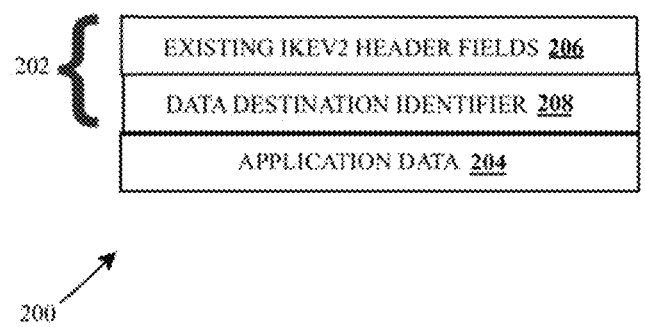
FIG. 2 is a block diagram illustrating an IKE package, according to an embodiment.

FIG. 2 is a block diagram illustrating an IKE package 200, according to an embodiment. The IKE package 200 includes an extension header 202 and application data payload 204. The IKE extension header 202 includes a plurality of fields 206 included in existing IKEv2 header format. For example, the fields 206 includes an initiator's SPI, a responder's SPI, next payload, etc. The IKE extension header 202 also includes a data destination payload 208 that includes the data destination identification information of the data destination where the application data packet is to be delivered. The IKE package 200 also includes the application data payload 204 that has the application data that is to be delivered to the data destination identified by the data destination identification information.

Figure 3:
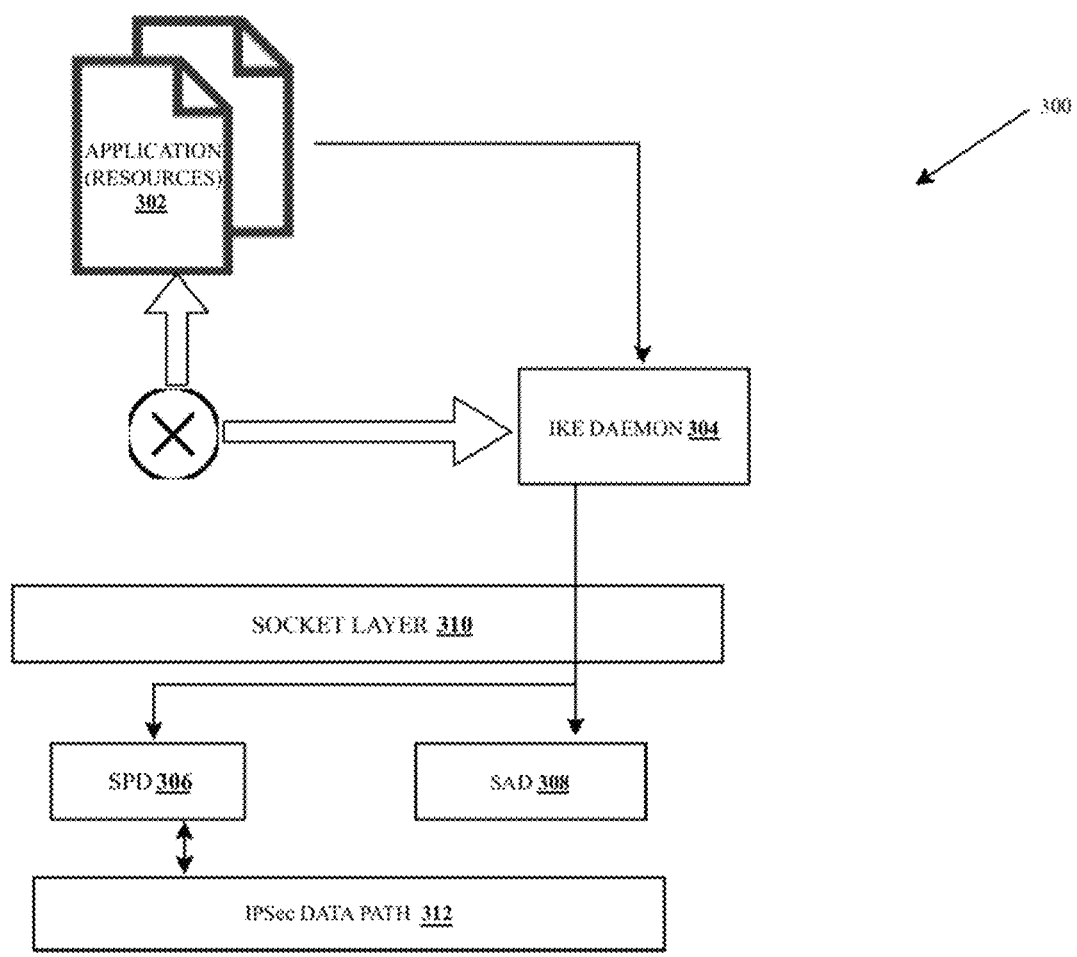
FIG. 3 is a block diagram illustrating a system to establish a peer to peer communication, according to an embodiment.

FIG. 3 is a block diagram illustrating a system 300 to establish a peer to peer communication, according to an embodiment. The system 300 includes an application (or resource) 302 that executes at a peer and is responsible for building P2P Network, Adhoc Network, or cloaked network. The application (or resource) 302 might be single/multiple applications interacting with each other between Peers using IKE Tunnel. The system 300 also includes an IKE daemon 304 running in User space which is responsible for handling IKEv1/IKEv2 Protocol. This is responsible for establishment and management of SAs for IKE and IPSec. The IKE daemon 304 runs on UDP Port 500/4500 or at a network gateway between the peers.

The IKE daemon 304 also includes a packet mux/demux. The packet mux/demux de-multiplexes incoming packets (UDP Port 500/4500) based on whether the packet belongs to IKE daemon 304 or applications (resources) 302. Further the application data packets are sent to the Applications corresponding to resource identifiers which were previously registered. Packet Multiplexer receives data packets from applications, encapsulates it in proposed IKEv2 Payload (described in FIG. 2), and sends the IKE package to IKE daemon 304 for transmission. The system 300 also includes a Security Policy Database (SPD) 306 and a Security Association Database (SAD) 308 that ensures secure communication between peers and/or the IKE daemons. SPD specifies the policies that determine the disposition of all IP traffic inbound or outbound from a host or a security gateway. SAD is a security association table, containing parameters that are associated with each security association.

The system also includes a socket layer 310 that is an Operating System networking stack which provides APIs for applications/resources to create User Datagram Packet (UDP) Sockets to communicate with Peers. Finally, the system 300 also includes an IPSec data path 312 that handles data path traffic.

Figure 4:
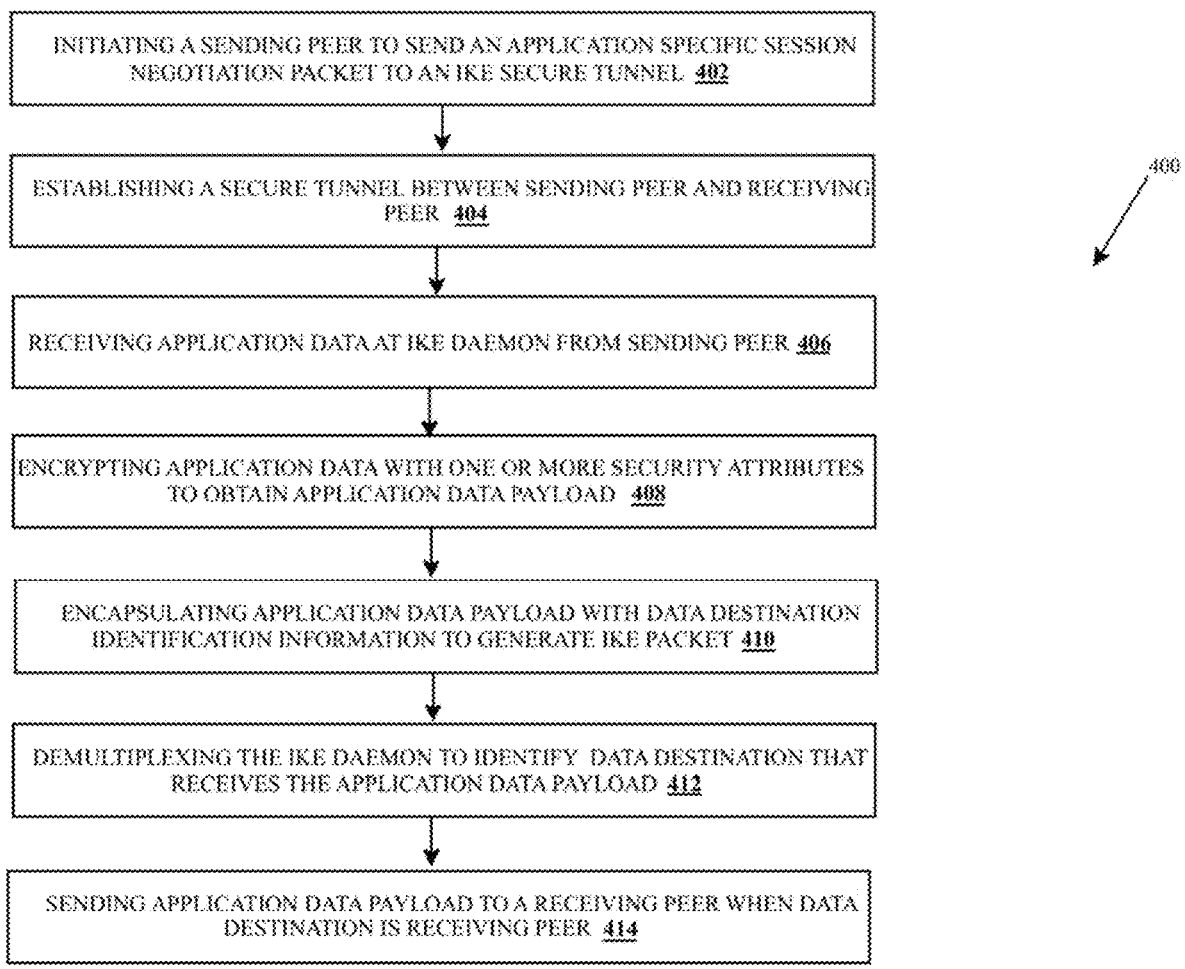
FIG. 4 is a flow diagram illustrating a process for peer-to-peer communication across network, according to an embodiment.

FIG. 4 is a flow diagram illustrating a process 400 for peer-to-peer communication across network, according to an embodiment. Initially a sending peer initiates sending an application specific session negotiation packet to establish an IKE secure tunnel between a sending peer and a receiving peer (402). Based on the received application specific negotiation packet, a secure IKE tunnel is established between the sending peer and the receiving peer (404).

An IKE secure tunnel may be created using IKE phase 1 and IKE phase 2 of tunnel negotiation. IKE phase 1 authenticates the IPSec peers to set up a secure channel between the peers to enable IKE exchanges. IKE phase 2 negotiates IPSec SAs to set up the IPSec tunnel.

Next an application data is received at an IKE daemon from the sending peer (406). The application data is encrypted with one or more security attributes to obtain an application data payload (408). Next the application data payload is encapsulated with data destination identification information to generate an IKE packet (410).

The generated IKE packet is then forwarded to an IKE daemon. At the IKE daemon the IKE packet is de-multiplexed to identify a data destination that receives the application data payload (412). Finally, the application data payload is send to the receiving peer when the data destination is the receiving peer (414).

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
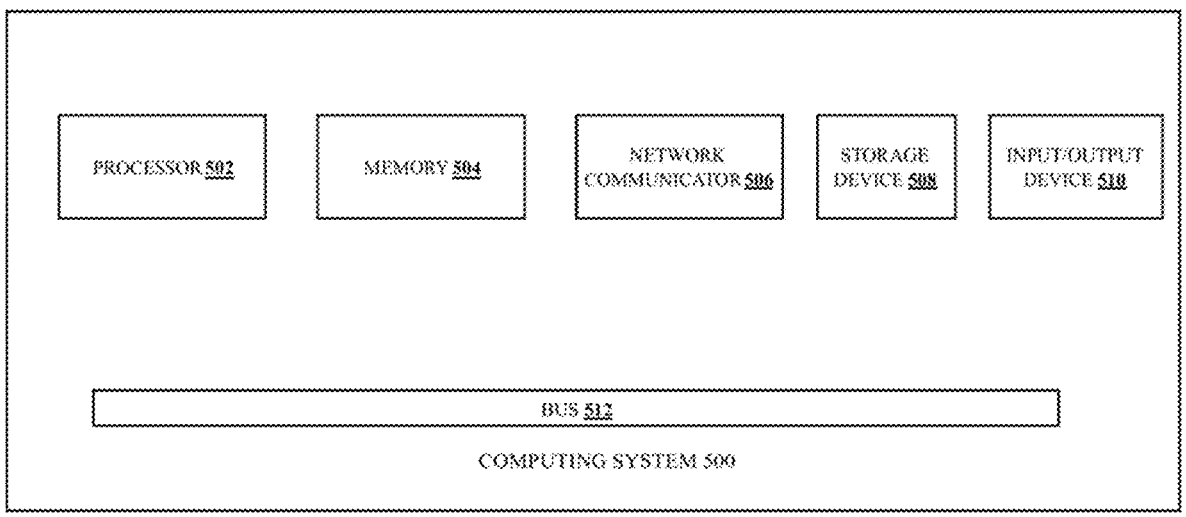
FIG. 5 is a block diagram illustrating a computing system consistent with implementations of the current subject matter.

FIG. 5 is a block diagram illustrating a computing system 500 consistent with implementations of the current subject matter. As shown in FIG. 5, the computing system 500 can include a processor 502, a memory 504, network communicator 506, a storage device 508, and input/output devices 510. The processor 502, the memory 504, network communicator 506, the storage device 508, and the input/output device 510 can be interconnected via a system bus 512. The processor 502 is capable of processing instructions for execution within the computing system 500. Such executed instructions can implement one or more components of, for example, application A. In some example embodiments, the processor 502 can be a single-threaded processor. Alternately, the processor 502 can be a multi-threaded processor. The processor 502 is capable of processing instructions stored in the memory 504 and/or on the storage device 508 to display graphical information for a user interface provided via the input/output device 510.

The memory 504 is a computer readable medium such as volatile or non-volatile that stores information within the computing system 500. The memory 504 can store instructions and/or other data associated with the processes disclosed herein. The storage device 508 is capable of providing persistent storage for the computing system 500. The storage device 508 can be a hard disk device, an optical disk device, or a tape device, or other suitable persistent storage means. The input/output device 510 provides input/output operations for the computing system 500. In some example embodiments, the input/output device 510 includes a keyboard and/or pointing device. In various implementations, the input/output device 510 includes a display unit for displaying graphical user interfaces.

According to some example embodiments, the input/output device 510 can provide input/output operations for a network device. For example, the input/output device 510 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. Upon activation within the applications, the functionalities can be used to generate the user interface provided via the input/output device 510. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitory, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method for peer-to-peer communication across a network, said method comprising the following steps:

sending an application data packet by a sending peer, to an internee key exchange (IKE) daemon;

encapsulating, at the IKE daemon, the application data packet with a data destination identifier, and obtaining an IKE packet incorporating the data destination identifier in an IKE extension header;

sending an application specific session negotiation packet, by the sending peer, to establish a secure IKE tunnel between the sending peer and a receiving peer;

sending the IKE packet from the sending peer to the receiving peer over the secure IKE tunnel;

de-multiplexing, at the receiving peer, received IKE packet to identify a data destination that receives the application data packet, the data destination identified based on the data destination identifier included in the IKE extension header; and forwarding the application data packet to the receiving peer when the data destination is the receiving peer.

2. The computer implemented method according to claim 1, further comprising:

sending the application specific session negotiation packet for another sending peer using the secure IKE tunnel.

3. The computer implemented method according to claim 1, further comprising:

registering the receiving peer at the IKE daemon.

4. The computer implemented method according to claim 1, further comprising:

encrypting the application data packet with one or more security attributes to obtain an application data payload; and encapsulating the application data payload with the data destination identifier incorporated within the IKE packet.

5. A network for peer-to-peer network communication, said network comprising a sending peer and a receiving peer, wherein the sending peer is configured to:

send an application data packet to an IKE daemon;

trigger said IKE daemon to encapsulate the application data packet with a data destination identifier and obtain an IKE packet incorporating the data destination identifier in an IKE extension header;

transmit an application specific session negotiation packet to a receiving peer, in order to establish a secure IKE tunnel between the sending peer and the receiving peer; and send the IKE packet to the receiving peer over the secure IKE tunnel; and wherein the receiving peer is configured to de-multiplex received IKE packet using a de-multiplexer, and identify a data destination that receives the application data packet, based on the data destination identifier included in the IKE extension header.

6. A computer system for peer-to-peer communication across a network, the system comprising:

a memory storing program code; and a processor in communication with the memory executing the program code, said processor configured by said program code to:

trigger a sending peer to transmit an application data packet to an IKE daemon;

trigger the IKE daemon to encapsulate the application data packet with a data destination identifier and obtain an IKE packet incorporating the data destination identifier in an IKE extension header;

trigger the sending peer to transmit an application specific session negotiation packet to a receiving peer, to establish a secure IKE tunnel between the sending peer and the receiving peer;

send the IKE packet from the sending peer to the receiving peer over the secure IKE tunnel;

trigger the receiving peer to receive the IKE packet incorporating the application data packet and the IKE extension header;

trigger the receiving peer to de-multiplex received IKE packet, and identify a data destination that receives the application data packet, based on the data destination identifier included in the IKE extension header; and forward the application data packet to the receiving peer when the data destination is the receiving peer.

7. The computer system according to claim 6, wherein said processor is further configured by the program code to:
send the application specific session negotiation packet for another sending peer using the secure IKE tunnel.

8. The computer system according to claim 6, wherein said processor is further configured by the program code to:
register the receiving peer at the IKE daemon.

9. The computer system according to claim 6, wherein said processor is further configured by the program code to:
trigger the sending peer to transmit the application data packet to an IKE packet stack of the IKE daemon;
trigger the IKE daemon to encapsulate the application data packet with one or more security attributes, and generate an application data payload; and
trigger the IKE daemon to encapsulate the application data payload with the data destination identifier incorporated within the IKE packet.

10. A non-transitory computer-readable medium containing instructions for peer-to-peer communication across a network, the instructions when executed by a computer, cause the computer to:

trigger a sending peer to transmit an application data packet to an IKE daemon;

trigger the IKE daemon to encapsulate the application data packet with a data destination identifier, and obtain an IKE packet incorporating the data destination identifier in an IKE extension header;

trigger the sending peer to transmit an application specific session negotiation packet to a receiving peer, to establish an secure IKE tunnel between the sending peer and the receiving peer;

send the IKE packet from the sending peer to the receiving peer over the secure IKE tunnel;

trigger the receiving peer to receive the IKE packet incorporating the application data packet and the IKE extension header;

trigger the receiving peer to de-multiplex received IKE packet, and identify a data destination that receives the application data packet, based on the data destination identifier included in the IKE extension header; and forward the application data packet to the receiving peer when the data destination is the receiving peer.

11. The non-transitory computer-readable medium of claim 10, further including instructions which when executed by the computer, cause computer to:

trigger the sending peer to transmit the application data packet to an IKE packet stack of the IKE daemon; and trigger the IKE daemon to encapsulate the application data packet with the data destination identifier, and obtain the IKE packet incorporating the data destination identifier in the IKE extension header.

* * * * *